March 17, 1964 E. J. HAKKA 3,125,147
ANTI-SKID DEVICE
Filed July 5, 1961

Inventor:
Ernest Juhana Hakka
by:
Michael S. Striker

United States Patent Office 3,125,147
Patented Mar. 17, 1964

3,125,147
ANTI-SKID DEVICE
Ernest Juhana Hakka, Ottawa, Ontario, Canada, assignor to Lennart Hakka, Lauttasaari, Finland
Filed July 5, 1961, Ser. No. 121,879
Claims priority, application Canada July 4, 1960
8 Claims. (Cl. 152—210)

This invention relates to an anti-skid device for rubber tires.

In the former art of the field, it is common practice to obtain increased friction in rubber tires under icy conditions by fastening a multitude of metal studs or inserts to the tire. These studs are usually quite large, some employing a "wear resistant" tip or core. The common mode of attaching the stud to the tire is by means of some arrangement of a bolt-like configuration which extends from the inside to the outside of the tire. The wear resistant tip is usually fastened to the body of the stud by means of threads or a taper fit.

This type of construction has many drawbacks. Firstly, because of their large size, which is necessitated by the high cost and method of attachment of the stud to the tire, they cause a large stress on the tire at the point of attachment, which stress may cause loosening of the stud. Secondly, the mode of attachment of the stud to the tire by means of a bolt raises the price of the stud. Thirdly, wear of the tire exposes the attachment mechanism to wear causing the stud to fall off after a period of time. Fourthly, the method of attachment of the wear resistant tip by means of threads or taper fit is both expensive and difficult.

I have found that these drawbacks can be overcome by making the stud in the general outline shape of a small bolt and consisting of a long hollow tubular body part having at one end an enlarged head in the general shape of a hemisphere or a truncated cone presenting its larger diameter toward the body part. This part of the stud is made of some reasonably easily worked but tough material. A wear resistant elongated insert is fixed by brazing, bonding, rolling, pressing, or forging in a hole running along the long axis of the tubular body part. This stud is fixed to the tire either by embedding it in the tread in the process of manufacture or by forcing it into a drilled hole, in the tread, of convenient diameter and length. The head of the stud, being of larger diameter than the body, keeps the stud from falling off or being forced deeper into the tread.

This configuration of the stud overcomes all the above objections while retaining the good qualities. Firstly, the stud, being flexibly mounted in the tire and being relatively small, does not present any excessively strain on the tire. Secondly, attachment of the stud to the tire is very inexpensive and simple. Thirdly, wear of the stud in no way affects the functioning of the attaching mechanism. Fourthly, soldering or brazing, bonding, rolling, pressing or forging of the insert to the body is very inexpensive and strong. In addition, this configuration has the added advantage that the stud is self-sharpening. This is because the body of the stud wears faster than the insert thus always exposing the insert which protrudes slightly beyond the tire. Since the stud is small, it can be pushed slightly into the tire by the weight of the car thus protecting it under dry road conditions from excessive wear and also preventing wear of the highway. Also, since the stud is relatively small, it creates very little noise on dry pavement.

In the drawings illustrating embodiments of the invention,

Figure 1:
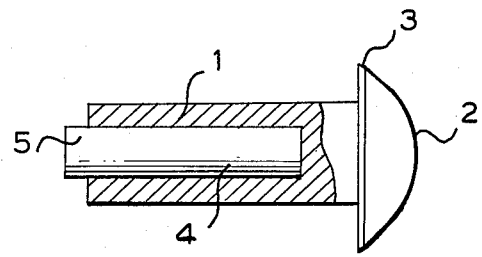
FIG. 1 shows a cut-away view of the stud.
Figure 2:
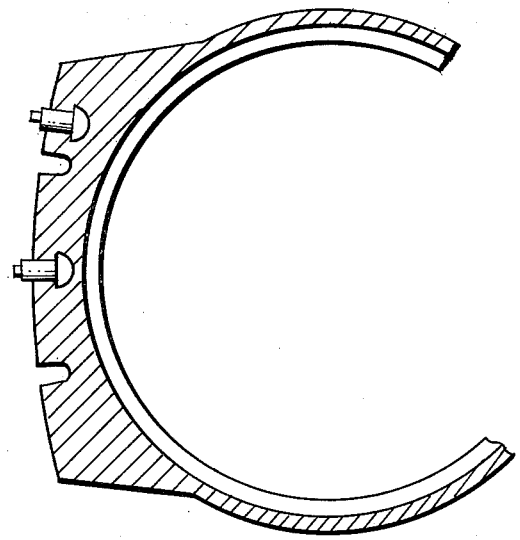
FIG. 2 shows a cross-section of a tire with studs.
Figure 3:
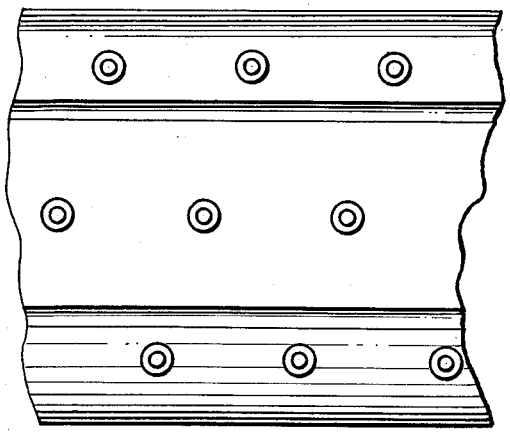
FIG. 3 shows a view of a tire illustrating a possible arrangement of studs in the tread.

The stud consists of a straight tubular body 1 with an enlarged head 2 at one end, in any convenient shape such as a hemisphere or a truncated cone, the whole being made in one piece of any suitable easily worked and tough material. The head 2 is such as to present a flat flange 3 toward the opposite end of the body 1. The said body has in it a round or any other conveniently shaped hole 4 running along the long axis of the said body, extending from the head 2 to the opposite end. In this hole is fixed an insert 5 made of material containing one or more of tungsten, titanium, tantalum, niobium or chromium carbides or other suitable compounds. The insert 5 is made in the shape of a round rod or rod corrugated in either its axial or radial directions, to increase the contact area between the insert and the body, and is of such length as to extend from near the head 2 to or beyond the opposite end of the body. The insert 5 is fixed to the body 1 by brazing or soldering with a suitable filler metal or alloy containing one or more of metals such as cobalt, copper, iron, nickel, tin or other suitable metals or compounds, or by bonding with some chemical adhesive, or by rolling, pressing or forging of the body against the insert, or by casting the body around the said insert.

These studs are fixed to the tire in convenient numbers and places, depending on the tire. Attachment of the studs to the tire is achieved by embedding the said stud in the tread its long axis perpendicular to the wear surface of the tread so that the end remote from the head 2 is adjacent to the road when the tire is in its normal operating attitude. The stud may be embedded in the tire during the process of manufacture of the tire or afterwards by forcing it into holes of a suitable diameter and depth made into the tire in any suitable manner, such as drilling.

The embodiments of the invention in which an exclusive property or privilege is claimed are defined as follows:

1. An anti-skid element comprising, in combination, an elongated metal body having a substantially uniform cross section throughout its length and being formed with an axial bore extending from one toward but short of the other end thereof and having at said other end a head integrally connected at one end thereof to said elongated body, said head extending at its connected end with an annular face substantially normal to the axis of the body beyond the periphery of the latter and tapering from said face toward its free end so that said head may be forced with its tapering end into a radial hole formed in the tread surface of a tire to anchor said head and body in the tire; and a wear resistant rod-shaped insert having a length only slightly longer than that of said bore and extending through the length of the latter fixedly secured along a major portion of the length in said bore and projecting only with a short end portion thereof beyond said one end of said body.

2. An anti-skid element as defined in claim 1 in which said head is in the form of a hemisphere.

3. An anti-skid element as defined in claim 1 in which said head is in the form of a cone-frustum.

4. An anti-skid device as described in claim 1 in which said insert is in the shape of a corrugated rod.

5. An anti-skid device as described in claim 1 in which said insert in fastened to said bore in the body by brazing with a filler material containing one or more of cobalt, copper, iron, nickel, tin or their compounds.

6. An anti-skid device as described in claim 1 in which the said insert is fastened in said bore in the body by bonding with some chemical adhesive.

7. An anti-skid device as described in claim 1 in which said insert is fastened in the said bore in the body by casting the said body around said insert.

8. In combination, a tire having a tread surface and being formed with a plurality of substantially radial blind bores extending from said tread surface inwardly into said tire; and a plurality of anti-skid elements inserted in and anchored in said bores, respectively, each of said anti-skid elements consisting of an elongated metal body having a substantially uniform cross section throughout its length and being formed with an axial bore extending from one toward but short of the other end of said body and having a head portion integrally connected at one end thereof to said other end of said body and extending at its connected end with an annular face substantially normal to the axis of said body beyond the periphery of the latter and tapering from said face toward its free end for facilitating forcing of the element into the respective bore of the tire, and a wear resistant rod-shaped insert having a length only slightly longer than that of said bore end extending through the length of of the latter fixedly secured along a major portion of the length in said bore and projecting only with a short end portion thereof beyond said one end of said body, said elements being anchored in said bores of said tire with said one end of each body projecting only a short distance beyond said tread surface.

References Cited in the file of this patent

UNITED STATES PATENTS

| 2,652,876 | Eisner | Sept. 22, 1953 |
| 2,982,325 | Pellaton | May 2, 1961 |

FOREIGN PATENTS

| 205,977 | Great Britain | Nov. 1, 1923 |
| 786,297 | Great Britain | Nov. 13, 1957 |
| 30,680 | Finland | May 14, 1960 |